United States Patent Office 3,370,508
Patented Feb. 27, 1968

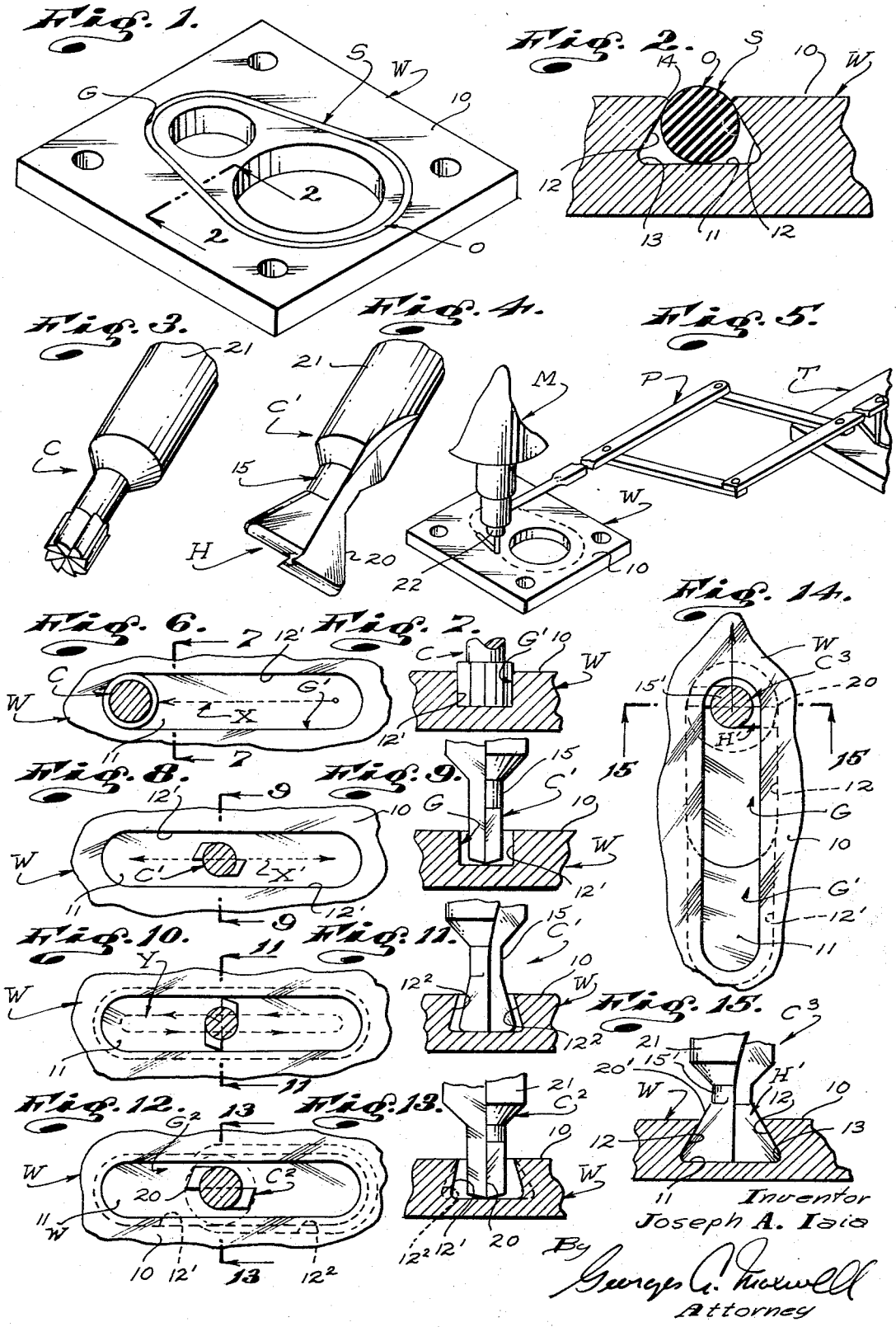

3,370,508
METHOD FOR ESTABLISHING O-RING
SEAL GROOVES
Joseph A. Iaia, 2715 Southeast Drive,
Los Angeles, Calif. 90043
Filed Jan. 10, 1966, Ser. No. 519,551
4 Claims. (Cl. 90—11)

Throughout all phases of industry and the many arts there is an ever-increasing demand for effective and dependable sealing means. To date, resilient, compressible O-ring seals have proven to be extremely effective and highly desirable. Such sealing rings are arranged in grooves in one of the meeting surfaces of two related, opposing pieces of work.

To date, O-ring grooves have been simple grooves having flat bottom and straight side walls, normal to the bottom walls.

The principal shortcoming of such O-ring grooves results from the fact that when the O-rings arranged therein are subjected to high pressures, from one side of the groove, the O-rings are urged toward the other or opposite sides of the grooves and are caused to flow and extrude between the meeting surfaces. Such extrusion occurs where the space between the surfaces are extremely small.

Flowing and/or extrusion of the O-rings, as set forth above, destroys the effectiveness of the O-rings and results in a complete breakdown of the sought-after seal.

Further, present day or conventional O-ring grooves are such that the rings are permitted to soak in fluid when fluid is being sealed; that is, fluid, such as petroleum products, flow into the grooves and soak the rings and cause them to swell up to a larger cross-section. The swollen or enlarged rings then extrude, cut and destroy themselves even when no internal pressure is involved, again resulting in a complete breakdown of the sealing structure.

As a result of the above, the major manufacturers of O-ring seals have developed and resorted to special sealing rings of unique cross-section, which rings have base portions that can be cemented, bonded or otherwise fixed in related grooves and which have head portions which are designed to, as nearly as possible, simulate the more effective and efficient O-ring seal.

It is sought, in such substitute or modified constructions, to hold the rings in the grooves and thereby prevent their being displaced and extruded therefrom. Further, special backup means are provided in such rings, which backup means are adapted to overlie and close the space between the mating surfaces of the related work and which seek to thereby prevent extrusion of the O-ring.

Another shortcoming found in the use of ordinary O-ring grooves is the fact that the groove provides no means for retaining the O-rings in engagement therein during assembly, dissassembly and/or working and manipulation of the structure with which the O-ring sealing structures are related.

In order to effect assembly of such constructions, it is common practice to stick or cement the rings in the grooves with grease or Vaseline, which is obviously undesirable.

The special substitute sealing rings structures referred to above do overcome the last-mentioned difficulty.

A major shortcoming of rubber or rubber-like sealing structures which are fixed in grooves, such as referred to above, is the fact that replacement of the rings is extremely difficult, time-consuming and costly. Since such rings are extremely fragile or delicate in nature and since it requires no more than an inadvertent pressing of one's fingernail on such a ring to damage it and render it ineffective, rings are such that they must be cemented or fixed in their related grooves and are not, in fact, desirable.

Further, the cements and the like employed to fix such rings in their related grooves are contaminates and are undesirable.

It is to be noted and understood that in the art of O-ring seals, the cross-sectional area of the grooves for the rings is equal to the cross-sectional area of the rings, or equal to the minimum cross-sectional area of the ring, when the ring is compacted and when it is subjected to the maximum anticipated pressure to which it is to be subjected. With such a relationship of parts, the rings, when compacted and in sealing relationship with their related work, establish a substantially solid sealing structure.

In extremely critical situations, when determining the cross-sectional areas of the ring grooves, allowance is made for irregularities in the surfaces of the groove and the mating surface on the work with which the ring is to be engaged.

The art has long recognized that a properly proportioned dovetail groove or O-ring seal is the ultimate in design and effectively eliminates all the shortcomings found in conventional O-ring grooves and eliminates the necessity of providing special, inferior, substitute sealing rings constructions, such as referred to above.

Dovetail O-ring grooves have the advantage of maintaining the O-rings in place; have the added advantage of controlling and directing any tendency for the O-ring to flow into the groove, per se, and to thereby effectively prevent extrusion of the rings between the mating surfaces of the work; and have the added advantage of permitting easy, quick and effective removal and replacement of damaged O-rings.

While the desirability and effectiveness of dovetailed O-rings has been established and proved and while the use of such O-ring grooves is advocated and suggested, the prior art has failed to develop and establish a practical and economically feasible method of establishing such grooves, particularly in the case of grooves of small dimension.

The problem encountered in establishing such grooves for O-ring are; the grooves should be endless and uninterrupted, that is, there can be no opening or break in the upper, minor, open sides thereof. Secondly, the grooves must be of absolutely uniform cross-section throughout their lineal extent and must be free from all irregularities in lateral extent which would result in variations in cross-sectional area of different portions of the grooves and which would thereby cause, induce or permit the O-rings to flow lineally in the grooves when subjected to pressure.

Since the grooves cannot have an opening, break or interruption in their upper open sides, the problem of how one can insert a single cutting tool for establishing a dovetail groove into a piece of work, without breaking or interrupting the outer side of such a groove has provided a problem which, for many years, has been ineffectively solved by the prior art.

To avoid the problem set forth above, the prior art has established such grooves by using three different cutters, one following the other, the first cutter establishing a simple pilot groove. The second cutter is inserted into the pilot groove, shifted laterally and then moved longitudinally of the pilot groove to establish an undercut at one side of the pilot groove; the third cutter is similar to and follows the second cutter, but undercuts the other side of the pilot groove.

The above-noted procedure, practiced by the prior art, is extremely costly and makes the establishment of such grooves prohibitive.

Further, the above procedure has proven to be undependable and ineffective, since it is practically impossible to maintain and keep the several cutters within sufficiently close tolerances and relationship to each other so as to establish a dovetail groove of sufficiently uniform cross-section.

Still further, such grooves can only be established in the above manner where the upper or outer open sides of the grooves are of substantial and sufficient lateral extent to accommodate the second and third cutters.

As a result of the foregoing, it is recognized by the prior art that the only way or manner in which a dovetail O-ring groove can be effectively established is by means of a single cutter, that is, by a method and/or means whereby the several surfaces of the groove are simultaneously established by a single, common cutting tool.

While establishing a large dovetail groove can often be satisfactorily carried out in the same or a similar multistep method, such as set forth above, and which has been practiced by the prior art, such grooves of small dimension and in the size range common to O-ring seals, cannot. This is due to the fact that as the size of the grooves increase, any variations in cross-section that might result or be built into the grooves as a result of the method used to establish the grooves, become proportionately less. It is therefore possible if the groove is large enough to make a groove in the manner practiced by the prior art, when the variations are within allowable tolerances.

Accordingly, the present invention is concerned with the effective establishment of dovetail O-ring grooves of small dimensions and which cannot be established in accordance with recognized machining practices and procedures.

An object of the present invention is to provide a novel method for establishing or making a dovetail O-ring groove.

Still another object of this invention is to provide a novel method for establishing dovetail O-ring grooves uniformly and accurately, quickly and economically.

The various objects and features of my invention will be fully understood from the following detailed description of a typical carrying out of my invention, throughout which description reference is made to the accompanying drawings, in which:

FIG. 1 is an isometric view of the piece of work with an O-ring sealing structure as provided by the present invention related therewith;

FIG. 2 is an enlarged detailed sectional view taken as indicated by line 2—2 on FIG. 1;

FIG. 3 is an enlarged isometric view showing the design of one cutter that can be employed in carrying out my new method;

FIG. 4 is an enlarged isometric view showing the design of other cutters employed in carrying out my new method;

FIG. 5 is a diagrammatic view of the machine and tooling that I employ;

FIG. 6 is a view of the first step employed in carrying out my new method;

FIG. 7 is a sectional view taken as indicated by line 7—7 on FIG. 6;

FIG. 8 is a diagrammatic view of another step provided by this invention;

FIG. 9 is a sectional view taken as indicated by line 9—9 on FIG. 8;

FIG. 10 is a view similar to FIG. 8 and showing yet another step provided by this invention;

FIG. 11 is a sectional view taken as indicated by line 11—11 on FIG. 10;

FIG. 12 is a diagrammatic view of another step of my new method;

FIG. 13 is a sectional view taken as indicated by line 13—13 on FIG. 12;

FIG. 14 is a view similar to FIG. 12 showing another step of my new method; and, FIG. 15 is a sectional view taken as indicated by line 15—15 on FIG. 14.

The present invention has to do with the method and apparatus for establishing an endless uninterrupted uniform dovetail groove in a flat surface of a piece of work and in which an O-ring seal is adapted to be arranged and maintained.

In FIG. 1 of the drawings I have illustrated a flat, plate-like piece of work W having a flat mating surface 10, which surface is adapted to oppose and establish flat bearing engagement on or with a related piece of work (not shown). The surface 10 of the work W is shown provided with a sealing structure S.

The sealing structure S is shown as including an endless, uninterrupted, uniform dovetail groove G entering the surface 10 and an endless, uninterrupted and uniform, resilient, compressible, round in cross-section O-ring O. The ring O is that type of sealing ring which is ordinarily made of rubber or synthetic rubber compounds.

The cross-sectional area of the groove and the ring O are, in accordance with accepted practice, substantially equal in cross-section.

The groove G has a flat bottom wall or surface 11 and upwardly and laterally inwardly inclined side walls or surfaces 12. The side walls are shown disposed at 30 degrees to the plane of the flat bottom wall.

The corners 13 established by the bottom and side walls are rounded or pivoted and the edges 14 defined by the side walls 12 and the top surface 10 of the work W are dressed and radiused, as clearly illustrated in FIG. 2 of the drawings.

The method that I provide involves generally; first, establishing a primary pilot groove G' of limited longitudinal extent and having a flat bottom 11' and parallel, vertical side walls 12'. The pilot groove G' is slightly less (for example, .001 inch) in lateral extent than the minor lateral extent, or open top, of the finished groove G, so as to leave sufficient stock to allow for proper dressing and cleaning up of the edges 14, as will hereinafter be described.

The primary pilot groove G' can be established by a simple, straight milling cutter C, such as is illustrated in FIGS. 3, 6 and 7 of the drawings, or, if desired, can be established by a two-bladed, fishtail cutter C', such as is shown in FIGS. 4, 8 and 9 of the drawings, the major radial extent of which is equal to or slightly less than the minor lateral extent of the finished groove G.

When the primary pilot groove G' is established with the simple straight cutter C, the cutter C is rotated and is then advanced into the work to the desired depth and is then advanced longitudinally along a predetermined line on the surface of the work, as indicated by the phantom arrow X.

The establishment of the primary pilot groove in the manner set forth above has been found to be necessary when the groove is established in extremely hard metals and the like.

When the primary pilot groove G' is established with the fishtail cutter C', the cutter is rotated and is reciprocated longitudinally along a predetermined line on the work as it is advanced into the work, as indicated by the phantom arrow X' in FIG. 8 of the drawings.

Establishment of the primary pilot groove G' with a fishtail cutter, as set forth above, is suitable in most situations and where the work is a relatively soft material or metal, such as aluminum.

After the primary pilot groove G' is established by a cutter C, as described above, and illustrated in FIGS. 6 and 7 of the drawings, the cutter C is withdrawn and the cutter C' is engaged or entered into the groove. The cutter C' is freely rotated in the groove and is then shifted laterally toward and longitudinally along one side of the groove and is then shifted laterally towards and longitudinally along the other or opposite side of the groove, as indicated by the phantom line Y in FIG. 10 of the drawings.

This second step serves to undercut the sides of the primary pilot groove as indicated at $12^2$ in FIGS. 10 and 11 of the drawings.

When the primary pilot groove is thus undercut, it is or may be termed the finished pilot groove and is, in the drawings, designated $G^2$.

When the primary pilot groove G' is initially established by the cutter C', in the manner set forth above and illustrated in FIGS. 8 and 9 of the drawings, the second undercutting operation, to establish the finished pilot groove G² is carried out in the same manner as set forth above and as a continuing or additional movement of the cutter C', thereby eliminating the necessity of changing cutters. This latter or alternative method step is carried out whenever possible as it eliminates the requirement of changing cutters and materially speeds the method.

It will be apparent that the major diametric extent of the head H of the cutter C' cannot exceed the minor lateral extent of the finished groove G. Further, it will be apparent that in order to facilitate lateral shifting of the cutter C' in the pilot groove G', to effect the desired undercutting operation, the minor diametric extent of the cutter head H and the stem 15 of the cutter must be substantially smaller than the minor lateral extent of the finished groove G.

In light of the foregoing, it will be apparent that when the finished groove G is to be of small dimensions, the cutter or cutters C' are necessarily small and delicate cutters and are such that they cannot be established with a major diameter which is greater than the lateral extent of the primary pilot groove, whereby they can be freely entered into the groove statically and then set into rotary motion and shifted to undercut the side walls and establish the finished pilot groove.

After the finished groove G² is established the central axis of the cutter C' is moved to intersect the central longitudinal axis of the groove G² at a point spaced from the ends of the groove and is lifted or shifted, freely from within the groove G².

The groove G² is accurately established to dimensions within minus .001 inch of the finished groove G.

If the groove G², established in accordance with the preceding, is sufficiently undersized so that more than .001 inch of stock must be removed from the work to establish the finished groove G, an intermediate fishtail cutter C² and an intermediate undercutting operation may be required.

If such an intermediate cutter must be employed and an intermediate undercutting operation performed, the intermediated cutter C² is engaged in the groove G² and is rotated and moved in the groove in the same or similar manner as the cutter C' in the second and last described method step.

When a second undercutting operation is required, which requirement is easily predetermined, the angle of the upwardly convergent cutting edges 20 of the head H of the first fishtail C' are disposed at a sharper or steeper incline than the side walls of the finished groove. For example, when the side walls of the finished groove are disposed at sixty degrees from the plane of the bottom wall, the side cutting edges of the cutter C' are disposed at an angle of from seventy to eighty degrees from the plane of the bottom of the pilot groove.

With the first fishtail cutter C' thus proportioned, the side walls of the pilot groove can be partially undercut, without requiring that an excessive bite into the work be made by the cutter C'.

The cutter C² is slightly less in major diametric extent than the major lateral extent of the partially finished and undercut pilot groove G² and is less in minor diametric extent than the minor lateral extent of the pilot groove and of the finished groove. The laterally upwardly convergent cutting edges 20 of the cutter C² are disposed at 60 degrees from the plane of the bottom wall or surface of the groove.

With the cutter C², as set forth above, it will be apparent that it can be statically positioned above the cutter of the groove G² with the plane of the blades parallel with the longitudinal axis of the groove. When thus positioned, it can be lowered into the confines of the groove (see FIGS. 12 and 13). When thus arranged and positioned in the groove, the cutter can be rotated freely. When set into rotary motion, the cutter C², like the cutter C' before it is shifted laterally towards and longitudinally along one side of the groove and then laterally towards and longitudinally along the other side of the groove, whereby the side walls are further undercut and finished to within the desired and above-noted tolerances, that is, to within minus .001 inch of the finished groove G.

It is to be noted that the second fishtail cutter is such that it will remove stock along the lower portions of the side walls of the pilot groove and will establish a new angle for the said side walls without increasing the width of the groove at its open top, without altering or changing the minor lateral extent of the groove.

When the last cutting operation is completed, the cutter C² is brought to rest with the plane of the blades parallel with the longitudinal axis of the pilot groove, is shifted longitudinally to a point intermediate the ends of the pilot groove, is shifted laterally to the longitudinal central axis of the groove and is then elevated from engagement in the groove.

It will be apparent that if the portion of the finished groove G is straight, the pilot groove is established in the surface 10 of the work W where the straight portion of the finished groove will ultimately occur.

If, on the other hand, no portion of the groove G is straight, the pilot groove is established on the mean radius line on which the radius of the finished groove will occur. In practice, where the groove is of irregular shape, the mean longitudinal axis of the largest radius or gentlest curve is selected as that line along which the pilot groove will be established.

Subsequent to the establishment of the finished pilot groove in accordance with the foregoing, a finish or finishing fishtail milling cutter C³ having a pair of diametrically outwardly projecting cutting wings or blades is entered into the finished pilot groove. The minor dimension, that is, the diametric extent of the shaft or stem 15' of the cutter and/or the thickness of the head H' thereof is slightly less than the minor lateral extent of the pilot groove and the finished groove. The major diametric extent of the head H' of the cutter C³ is equal to the major lateral extent of the finished groove G and, accordingly, is slightly greater than the major lateral extent of the pilot groove. The angle of the side cutting edges 20' of the finishing cutter are disposed at thirty degrees from vertical or at sixty degrees from the plane of the bottom of the groove.

Accordingly, when the cutter C³ is arranged with the plane of its blades in alignment with the longitudinal axis of the pilot groove, the head H of the cutter can be lowered into the groove, as clearly illustrated in FIGS. 14 and 15 of the drawings. When the cutter C³ is engaged in the groove in the manner set forth above, it is set into motion or rotation to dress the undercut sides of the pilot groove and to dress the bottom of said pilot groove.

When the cutter C³ is thus rotated, it is advanced longitudinally of the pilot groove and thence into the adjacent body of the work, as clearly illustrated in FIG. 14 of the drawings. The cutter is advanced into the work in a predetermined direction or along a predetermined path to define the finished groove G and until the cutter is advanced around to and reenters the pilot groove to join the ends of the finished groove.

When the cutter C³ is thus advanced and the loop of the groove G is finished, the cutter is stopped with the plane of its blade parallel with the axis of the groove G and is elevated or shifted from engagement therein.

It will be apparent that when initiating the last-mentioned step of my new method, the cutter C³ must be statically positioned in the pilot groove and when set into rotary motion, initially or immediately, bites into and removes stock from the work. Accordingly, the cutter C³, unlike the cutter or cutters C' and C², must be considerably stouter and stronger. Since the finishing cutter C³ need not be shifted laterally in the pilot groove to effect undercutting the side walls thereof, the minor diametric extent of the cutter C³, particularly the stem 15′ thereof, need only be slightly smaller or less than the minor lateral extent of the groove. Accordingly, the cutter C³ can be made sufficiently strong, heavy and stout to withstand the strains and forces encountered when it is set into rotary motion in the pilot groove and initiates the last cutting and finishing operation of the pilot groove.

Subsequent to removal of the cutter C³ the edges 14 of the groove G are dressed by means of a suitable hand tool and/or emery cloth.

It will be apparent that in practice, the stems of the fishtail cutters must be carried by and project from a larger diameter shank or shanks 21 which are such that they can be advantageously engaged by a chuck or head 22 of a milling machine M (diagrammatically illustrated in FIG. 5 of the drawings).

In practice, and as illustrated in FIG. 5 of the drawings, the apparatus that I provide includes a pantograph P related to and directing the head H of the milling machine M with which the cutter or cutters and work W are related and a template T for the groove G and which is related to the pantograph to be followed and traced thereby.

In practice, the pantograph P might be connected with and related to the work support of the milling machine without departing from the spirit of this invention.

It will be apparent from the foregoing that I have invented an extremely simple, effective, fast and economical method for accurately establishing small dimension dovetail grooves for receipt of O-ring seals.

Having described only a typical preferred form and carrying out of my invention, I do not wish to be limited to the specific details herein set forth, but wish to reserve to myself any modifications and/or variations that may appear to those skilled in the art and which fall within the scope of the following claims.

Having described my invention, I claim:

1. The method of establishing an uninterrupted O-ring receiving groove entering the top surface of a piece of work and having a flat bottom wall and laterally inwardly and upwardly inclined side walls, which involves; first, selecting a first fishtail milling cutter having an elongate vertical stem, the radial extent of which is less than the difference between the major and the minor lateral extent of the groove to be established, and having a head with outwardly projecting, cutter blades with upwardly and radially inwardly inclined cutting edges disposed at the angle of the side walls of said groove, the major diametric extent of the head being equal to or less than the minor lateral extent of said groove, the axial extent of the head being equal to or greater than the depth of said groove; next, arranging the first milling cutter above the work on a vertical axis intersecting the means longitudinal axis line on the surface of the work along which said groove is to be established; next, rotating said first cutter and reciprocating it longitudinally along said line a distance equal to or greater than the major lateral extent of said groove and lowering it into the work to a depth to which the groove will enter said work, to establish a pilot groove; next, removing said first cutter from the pilot groove; next, selecting a second fishtail cutter having an elongate, vertical stem the diameter of which is less than the minor lateral extent of said groove and having a head with laterally outwardly projecting, cutting blades with upwardly and radially inwardly inclined cutting edges disposed at the angle of the side walls of said groove, the major diametric extent of the head of said second cutter being equal to the major lateral extent of said groove and the minor diametric extent of said head being equal to or less than the minor lateral extent of said groove; next, positioning said second cutter statically above the work with the plane of its blades parallel with the central longitudinal axis of the pilot groove; next, lowering said second cutter into said pilot groove; next, rotating said second cutter; next, advancing said second cutter longitudinally along and about the mean longitudinal axis line on the surface of the work along which said groove is to be established; next, stopping said second cutter with the plane of its blades parallel with the longitudinal axis of the groove; and, finally, shifting said second cutter vertically from within the groove.

2. The method of establishing an uninterrupted, O-ring receiving groove entering the top surface of a piece of work and having a flat bottom wall and laterally inwardly and upwardly inclined side walls, which involves; first, selecting a first cutter with a head having substantially radially disposed bottom cutting edges and vertical side cutting edges, the major diametric extent of said head being substantially equal to and not greater than the minor lateral extent of the groove to be established; next, arranging said first cutter above the work on a vertical axis intersecting the mean longitudinal axis line on the surface of the work along which said groove is to be established; next, rotating and lowering the said first cutter into the work to a depth to which said groove will enter said work and shifting said first cutter longitudinally along said line a distance equal to or greater than the major lateral extent of said groove to establish a primary pilot groove; next, removing said first cutter from said primary pilot groove; next, selecting a second, fishtail cutter having an elongate vertical stem the radial extent of which is less than the difference between the major and minor lateral extent of said groove and having cutter blades with upwardly and radially inwardly inclined cutting edges disposed at the angle of the side walls of said groove, the major diametric extent of the head of the second cutter being equal to or less than the minor lateral extent of the primary pilot groove, the axial extent of the head of said second cutter being equal to or greater than the depth of said groove; next, entering said second cutter into said primary pilot groove and rotating said cutter; next shifting said second cutter along each side wall of the primary pilot groove and shifting said second cutter laterally into the adjacent work a distance equal to but not exceeding one-half the difference between the major and minor lateral extent of said groove, and to define a finished pilot groove; next, selecting a third fishtail cutter having an elongate vertical stem the diameter of which is less than the minor lateral extent of said groove and having outwardly projecting cutter blades with upwardly and radially inwardly inclined cutting edges disposed at the angle of the side wall of said groove, the major diametric extent of the head of said third cutter being equal to the major lateral extent of said groove, the minor lateral extent of the head of said third cutter being equal to or less than the minor lateral extent of said groove; next, positioning said third cutter statically above the pilot groove with the plane of the blades thereof parallel with the central longitudinal axis of the pilot groove; next, lowering said third cutter into the pilot groove; next, rotating said third cutter; next, advancing said third cutter longitudinally along and about the mean longitudinal axis line on the surface of the work along which the groove is to be established; next, stopping said third cutter with the plane of its blades parallel with the longitudinal axis of the groove; finally, shifting the third cutter vertically from within the groove.

3. The method of establishing an uninterrupted O-ring receiving groove in the top surface of a piece of work and having a flat bottom wall and laterally inwardly and upwardly inclined side walls, which involves; first, selecting a first cutting tool with a head having substantially radially disposed bottom cutting edges and vertical side cutting edges, the major diametric extent of said head being substantially equal and not greater than the minor lateral extent of the groove to be established; next, arranging said first tool above the work on a vertical axis intersecting the mean longitudinal axis line on the surface of the work along which the groove is to be established; next, rotating and lowering said tool into the work to a depth to which the groove will enter said work and shifting said tool longitudinally along said line a distance equal to or greater than the major lateral extent of said groove and to establish a primary pilot groove; next, removing said tool from said primary pilot groove; next, selecting an intermediate milling cutter having an elongate vertical stem and a head at the lower end of the stem, said head having upwardly and radially inwardly inclined cutting edges disposed at an angle intermediate the angle of the side walls of said groove, the major diametric extent of said head being equal to or less than the lateral extent of the primary pilot groove, the vertical extent of the head being equal to or greater than the depth of said primary pilot groove; next, arranging said intermediate cutter in the primary pilot groove and rotating said cutter; next, shifting said intermediate cutter longitudinally of and laterally into each side of the primary pilot groove to undercut the side walls thereof and to establish a semi-finished pilot groove; next, selecting a second fishtail milling cutter having an elongate vertical stem, the radial extent of which is less than the difference between the major and minor lateral extent of said groove and having a head with upwardly and radially inwardly inclined cutting edges disposed at the angle of the side walls of said groove, the major diametric extent of the head of said finish cutter being equal to the major lateral extent of the groove and the minor diametric extent of said head being equal to less than the minor lateral extent of said groove; next, positioning the finish cutter statically above the pilot groove with the plane of its blades parallel with the central longitudinal axis of the pilot groove; lowering said finish cutter into the pilot groove; next, rotating said finish cutter; next, advancing said finish cutter longitudinally along and about the mean longitudinal axis line on the surface of the work along which the groove is to be established; next, stopping said finish cutter with the plane of its blades parallel with the longitudinal axis of the groove and, finally, shifting said finish cutter vertically from within the groove.

4. The method of establishing an uninterrupted O-ring receiving groove entering the top surface of a piece of work and having a flat bottom wall and laterally inwardly and upwardly inclined side walls, which involves: first, selecting a first milling cutter with an elongate vertical stem, the radial extent of which is less than the minor lateral extent of the groove to be established, a head at the lower end of the stem and having upwardly and radially inwardly inclined cutting edges disposed at an angle between vertical and the angle of the side walls of said groove, the major diametric extent of said head being equal or less than the minor lateral extent of said groove, the vertical extent of said head being equal to or greater than the depth of said groove; next, arranging the first cutter above the work on a vertical axis intersecting the mean longitudinal axis line on the surface of the work along which the groove is to be established; next, rotating said cutter and reciprocating said cutter longitudinally along said line a distance equal to or greater than the major lateral extent of said groove and lowering said cutter into the work to a depth to which the groove is to be established and to define a primary pilot groove; next, shifting said first cutter longitudinally of and laterally into each side of the primary pilot groove a distance not to exceed one-half the difference between the major and minor lateral extent of said groove; next, removing said first cutter from within the primary pilot groove; next, selecting a second milling cutter having an elongate vertical stem, the radial extent of which is less than the difference between major and the minor lateral extent of said groove and having a head at its lower end with upwardly and radially outwardly inclined cutting edges disposed at the angle of the side walls of said groove, the major diametric extent of the head of said second cutter being equal to or less than the minor lateral extent of said groove, the axial extent of the head of said second cutter being at least equal to the depth of the primary pilot groove; next, entering said second cutter into the primary pilot groove; next, rotating said second cutter and shifting said second cutter longitudinally of and laterally into each side of the primary pilot groove to undercut the side walls thereof and to establish a finished pilot groove; next, removing said second cutter from the within pilot groove; next, selecting a third, fishtail milling cutter having an elongate vertical stem, the diameter of which is less than the minor lateral extent of said groove and having a head with laterally outwardly projecting cutter blades with upwardly and radially inwardly inclined cutting edges disposed at the angle of the side wall of said groove, the major diametric extent of the head of said third cutter being equal to the major lateral extent of said groove, the minor lateral extent of the head of said third cutter being equal to or less than the minor lateral extent of said groove; next, positioning said third cutter statically above the pilot groove with the plane of the blades thereof parallel with the central longitudinal axis of the pilot groove; next, lowering said third cutter into the pilot groove; next, rotating said third cutter; next, advancing said third cutter longitudinally along and about the mean longitudinal axis line on the surface of the work along which said groove is to be established; next, stopping said third cutter with the plane of its blades parallel with the longitudinal axis of the groove; finally, shifting the third cutter vertically from within the groove.

No references cited.

FRANCIS S. HUSAR, *Primary Examiner*.